(12) United States Patent
Ittogi

(10) Patent No.: US 7,650,499 B2
(45) Date of Patent: Jan. 19, 2010

(54) ENCRYPTION APPARATUS AND DECRYPTION APPARATUS

(75) Inventor: Hirotaka Ittogi, Susono (JP)

(73) Assignee: Canon Kabushiki Kaisha, Tokyo (JP)

( * ) Notice: Subject to any disclaimer, the term of this patent is extended or adjusted under 35 U.S.C. 154(b) by 912 days.

(21) Appl. No.: 11/175,146

(22) Filed: Jul. 7, 2005

(65) Prior Publication Data
US 2006/0026442 A1 Feb. 2, 2006

(30) Foreign Application Priority Data
Jul. 27, 2004 (JP) ............................... 2004-218842

(51) Int. Cl.
*H04L 29/06* (2006.01)
*G09C 5/00* (2006.01)

(52) U.S. Cl. .................... 713/161; 713/181; 380/28

(58) Field of Classification Search ............... 713/161
See application file for complete search history.

(56) References Cited

U.S. PATENT DOCUMENTS

| | | | | |
|---|---|---|---|---|
| 4,933,969 A | * | 6/1990 | Marshall et al. | 713/177 |
| 5,757,913 A | * | 5/1998 | Bellare et al. | 713/168 |
| 5,915,024 A | * | 6/1999 | Kitaori et al. | 713/176 |
| 6,128,737 A | * | 10/2000 | Jakubowski et al. | 713/181 |
| 6,161,183 A | * | 12/2000 | Saito et al. | 713/176 |
| 6,819,766 B1 | * | 11/2004 | Weidong | 380/277 |
| 6,954,815 B2 | | 10/2005 | Kondo | |
| 7,092,524 B1 | * | 8/2006 | Timmel | 380/28 |
| 2004/0019785 A1 | * | 1/2004 | Hawkes et al. | 713/168 |
| 2004/0107237 A1 | | 6/2004 | Kashiwada | |
| 2004/0221153 A1 | * | 11/2004 | Kim et al. | 713/150 |

FOREIGN PATENT DOCUMENTS

| | | |
|---|---|---|
| JP | 8-307413 | 11/1996 |
| JP | 2002-008382 | 1/2002 |
| JP | 2002-149626 | 5/2002 |
| JP | 2002-152458 | 5/2002 |
| JP | 2002-157139 | 5/2002 |
| JP | 2002-175193 | 6/2002 |
| JP | 2002-358117 | 12/2002 |
| JP | 2004-110610 | 4/2004 |
| WO | 02/057904 | 7/2002 |

\* cited by examiner

*Primary Examiner*—Matthew B Smithers
(74) *Attorney, Agent, or Firm*—Fitzpatrick, Cella, Harper & Scinto

(57) ABSTRACT

An encryption apparatus divides input original data into one or more data blocks. The size of each data block is an integer multiple of the bank size of a non-volatile memory equipped in a decryption apparatus. The encryption apparatus generates authentication data from this data block. The encryption apparatus generates encrypted data after it combines the authentication data to the data block. On the other hand, a decryption apparatus executes reverse processes to decrypt original data, and writes it in a non-volatile memory.

4 Claims, 15 Drawing Sheets

F I G. 1
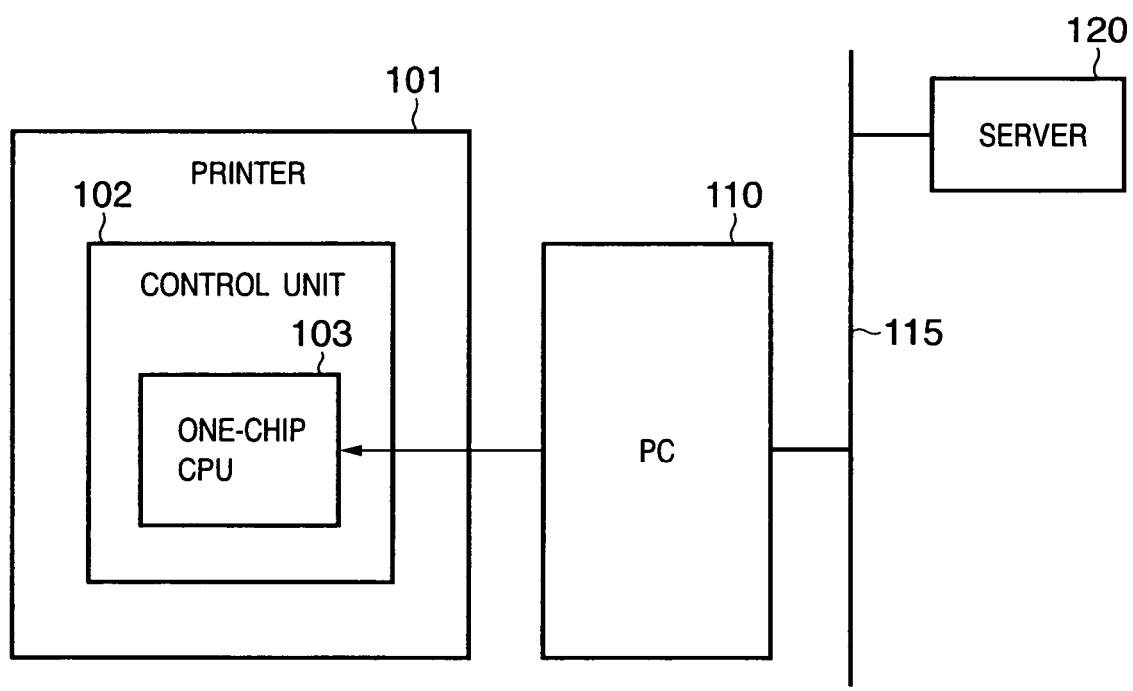

ENCRYPTION APPARATUS AND DECRYPTION APPARATUS

FIELD OF THE INVENTION

This invention relates to encryption and decryption techniques that can assure security of data to be transferred.

BACKGROUND OF THE INVENTION

In recent years, a system that provides data, upgrade software, and the like to users via a network has been proposed. Since these data and software often include important information, they must be protected from leakage, illicit copies, tampering, or the like.

As one of protection techniques, a MAC (message authentication code) authentication technique is known. MAC is authentication data of a short fixed length, which is generated by conventional encryption, and is normally sent while being appended to a message. This authentication technique is based on the premise that two entities A and B that engage with communications share key K. Upon sending a message from A to B, sending entity A calculates MAC=Ck(M) as a function of the message and the key, and sends the message together with the calculated MAC to receiving entity B. Receiving entity B makes an arithmetic operation of the received message using the same key and function as those used by sending entity A to calculate MAC for comparison. If the received MAC matches the calculated MAC, it is determined that the message is not tampered with or the like during sending.

According to a technique described in Japanese Patent Laid-Open No. 2002-152458, MAC is appended to whole original data such as firmware or the like, and the original data is encrypted. The obtained encrypted data is sent to a receiving terminal, which decrypts the encrypted data, and authenticates using the decrypted MAC. Then, the receiving terminal writes the decrypted data in a non-volatile ROM.

However, in the related art, authentication cannot be made unless all encrypted data in large quantity are received. In addition, the following problems are posed.

(1) A RAM area that can store all the encrypted data and all the decrypted data is required.

(2) In order to execute an authentication process, the MAC must be calculated using all the encrypted data, and it takes a long time to find tampering and the like.

(3) When the size of the original data is larger than the bank size of the non-volatile ROM, the original data cannot be written at the same time, and it complicates the writing program.

On the other hand, in the related art, when the aforementioned encrypted data is written in the non-volatile ROM as needed, the following problems are encountered.

(1) A RAM area that can store all the encrypted data is required.

(2) In order to execute an authentication process, the MAC must be calculated using all the encrypted data, and it takes a long time to find tampering and the like.

(3) Since write access to the non-volatile ROM is made as needed, if data has been tampered with, recovery requires much time.

(4) When the original data is larger than the bank size of the non-volatile ROM, the original data cannot be written at the same time, and it complicates the writing program.

It is, therefore, the object of this invention to solve the above and other problems. Note that other problems will be understood throughout the whole specification.

SUMMARY OF THE INVENTION

This invention is directed to an encryption apparatus which encrypts original data to be written in a rewritable non-volatile memory, and the encryption apparatus divides input original data into one or more data blocks. The size of each data block is, e.g., an integer multiple of the bank size of the rewritable non-volatile memory. The encryption apparatus generates authentication data using the first encryption key for this data block. The encryption apparatus combines the authentication data to the data block. The encryption apparatus generates encrypted data using the second encryption key for the data block combined with the authentication data. On the other hand, a decryption apparatus executes reverse processes to those described above to decrypt original data, and writes the original data in a non-volatile memory.

As described above, according to this invention, since authentication and encryption are executed for each of a plurality of original data which are divided in correspondence with the bank size of the non-volatile memory, the use size of the RAM can be reduced compared to the conventional method. If tampering or the like has occurred along a transmission path, the problem can be found within a shorter period of time than the conventional method. Furthermore, the data block that has been decrypted and authenticated can be written in the non-volatile ROM at the same time. Therefore, a simpler program required to write data can be used compared to the conventional method.

Other features and advantages of the present invention will be apparent from the following description taken in con unction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 1 is a block diagram showing an example of the arrangement of a data transfer system according to an embodiment of the present invention;

DETAILED DESCRIPTION OF THE PREFERRED EMBODIMENTS

Preferred embodiments of the present invention will now be described in detail in accordance with the accompanying drawings.

First Embodiment

FIG. 1 is a block diagram showing an example of the arrangement of a data transfer system according to this embodiment. The system shown in FIG. 1 includes a printer 101 which requests data such as a firmware program and the like, and a PC 110 which receives the request from the printer 101, and exchanges requested data with a server 120 via a network 115.

The printer 101 includes a control unit 102 which systematically controls respective units of the printer 101. A one-chip CPU 103 is mounted on the control unit 102.

Figure 2:
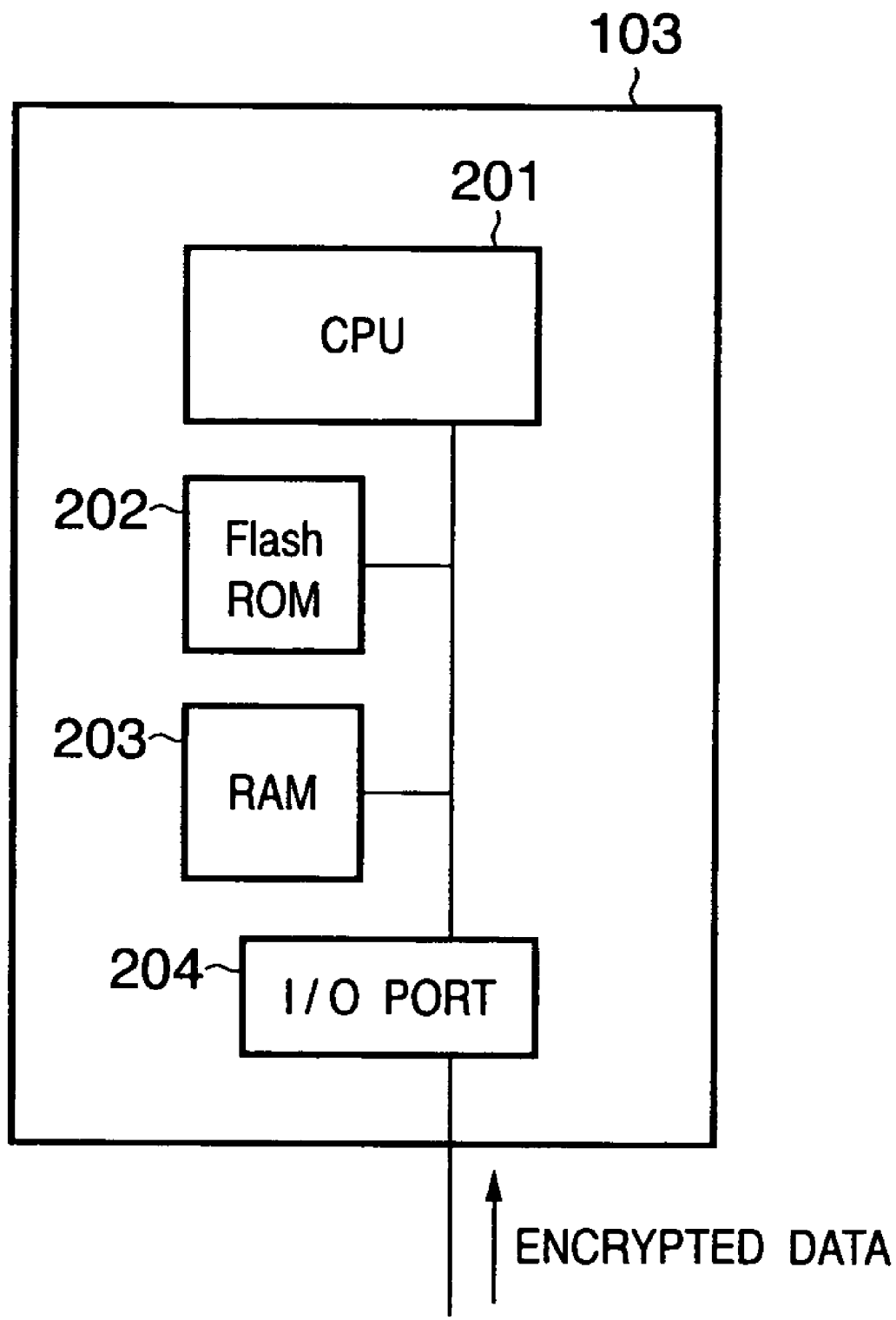
FIG. 2 is a block diagram showing an example of the arrangement of a one-chip CPU 103 according to the embodiment of the present invention.

FIG. 2 is a block diagram showing an example of the arrangement of the one-chip CPU 103 according to this embodiment. The one-chip CPU 103 integrates, as one chip, a CPU 201 which executes arithmetic processing of input data, a flash ROM 202 that stores programs to be executed by the CPU 201 and data, a RAM 203 used as a work area of the CPU 201, and an I/O port 204 that exchanges data.

Figure 3:
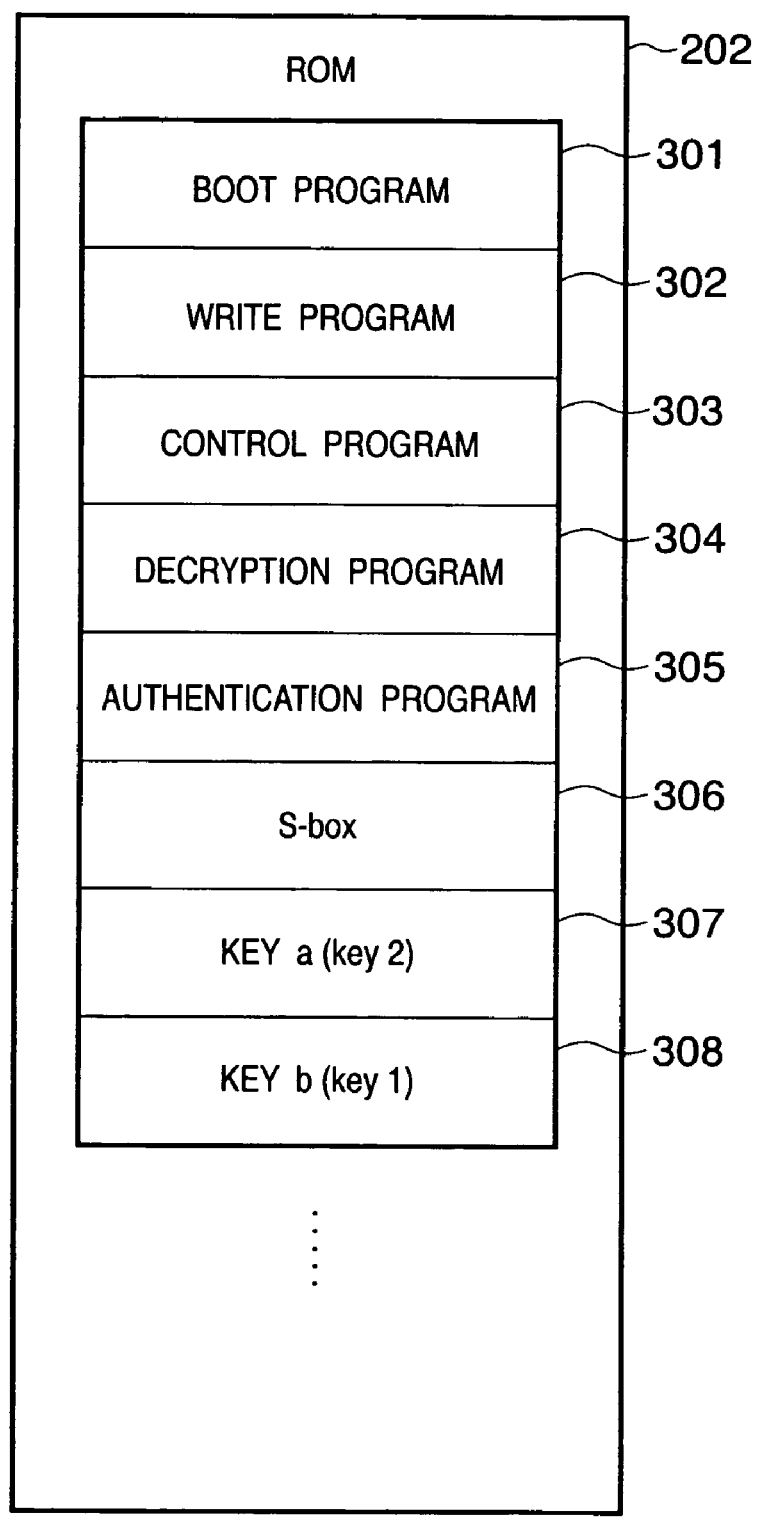
FIG. 3 shows an example of programs and data stored in a ROM of a printer.

FIG. 3 shows an example of programs and data stored in a ROM of the printer. The ROM stores a boot program 301 which is launched when the power switch of the printer 101 is turned on, a write program 302 which rewrites the programs of the printer 101, a control program 303 which controls image formation and the like in the printer 101, a decryption program 304 which decrypts data sent to the one-chip CPU 201, an authentication program 305 which authenticates data sent to the one-chip CPU 201, an S-box 306 as data used in the decryption process and authentication process, a key a 307 as data used in the decryption process, and a key b 308 as data used in the authentication process. The S-box 306 is a matrix used to convert input data into nonlinear data and to output the nonlinear data.

Figure 4:
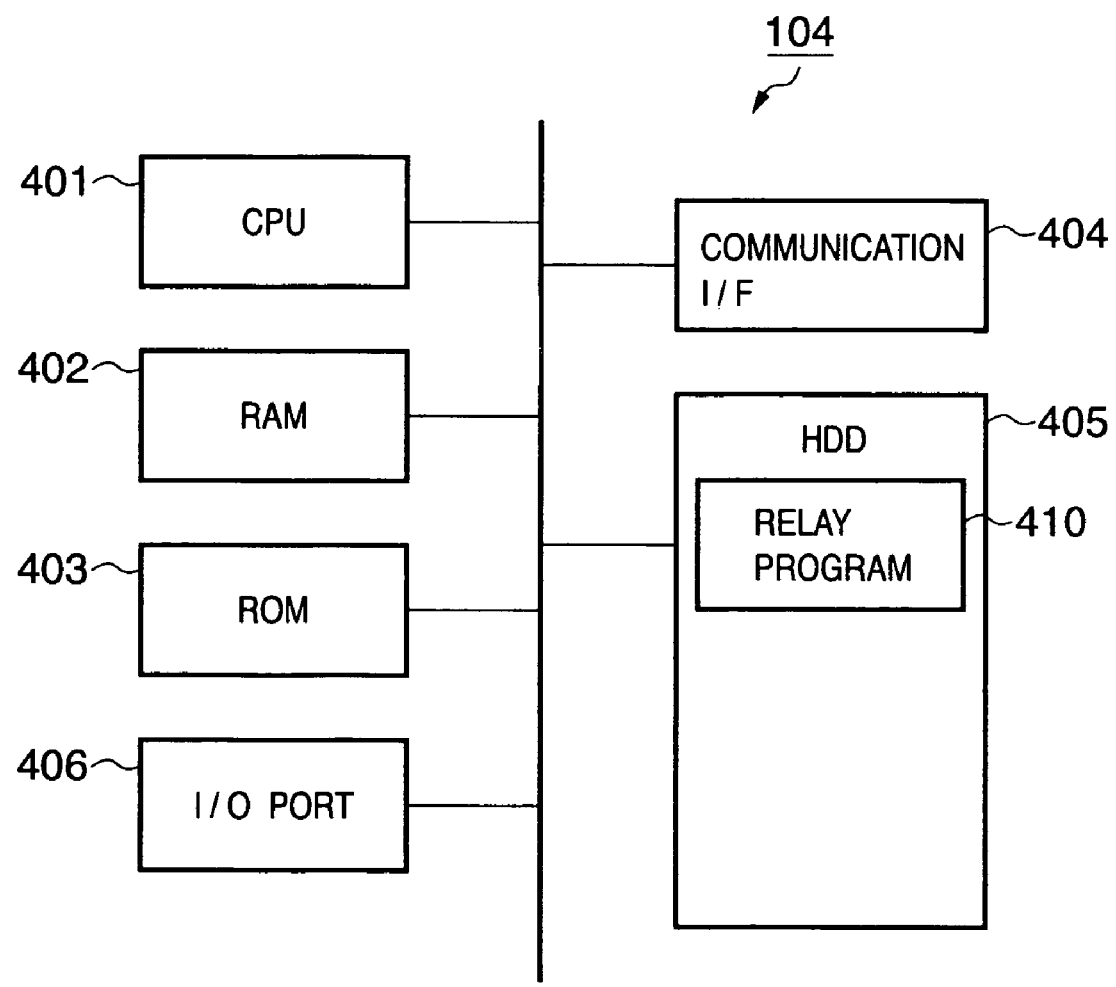
FIG. 4 is a block diagram showing an example of a PC according to the embodiment of the present invention.

FIG. 4 is a block diagram showing an example of the PC according to this embodiment. A CPU 401 is a central processing unit which systematically controls the PC 110. A RAM 402 is a readable/writable non-volatile memory which serves as a work area. A ROM 403 is a non-volatile memory which stores a boot program and the like. A communication interface 404 is a communication circuit which communicates with the server 120 via the network 115. A hard disk drive 405 is a large-capacity storage device, which stores a relay program 410 and the like. The relay program 410 is software which executes a relay process upon exchanging encrypted data between the printer 101 and server 120. An I/O port 406 is paired with an I/O port 204, and is used to exchange data. More specifically, the PC 110 and printer 101 are connected via an interface such as USB, IEEE1394, Ethernet(R), a wireless LAN, Bluetooth, or the like.

Figure 5:
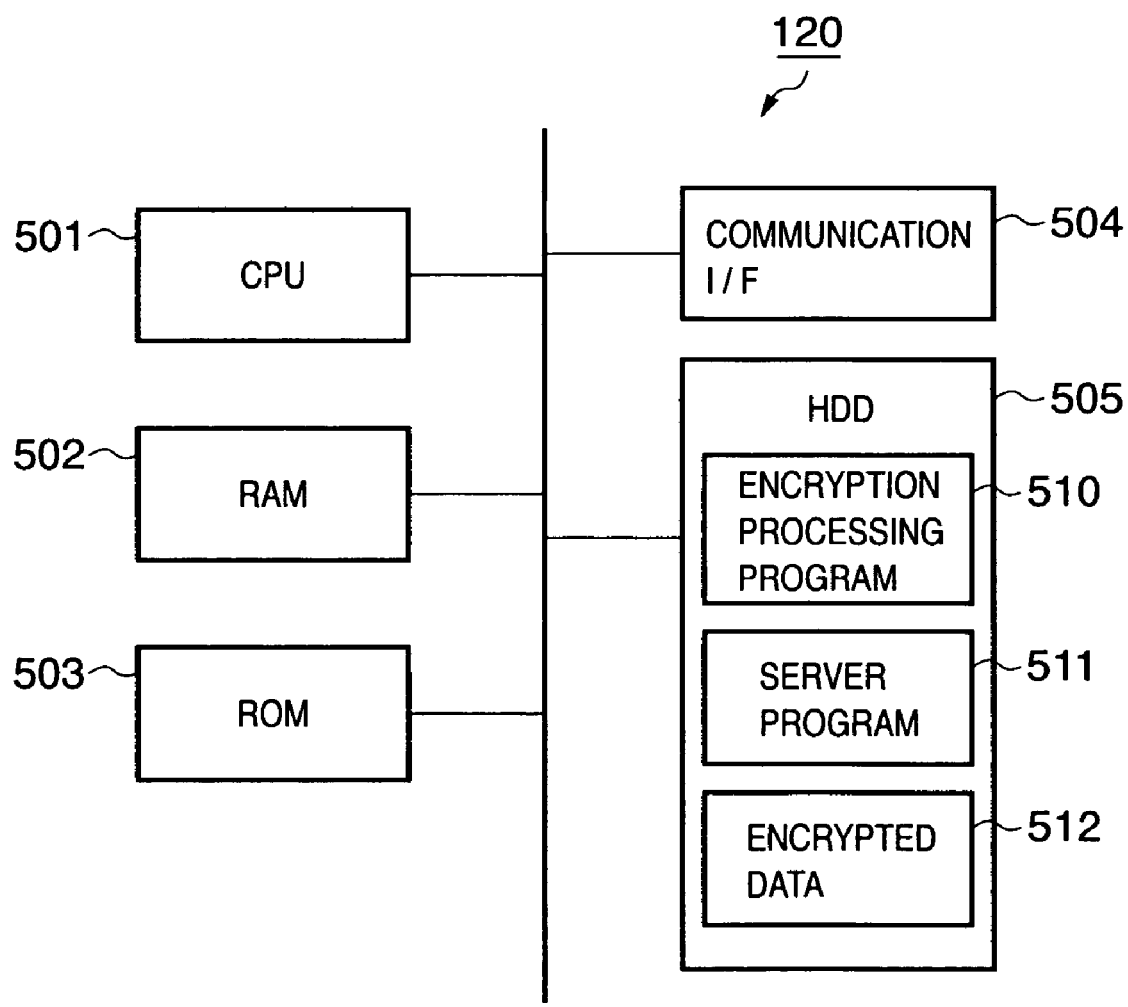
FIG. 5 is a block diagram showing an example of a server according to the embodiment of the present invention.

FIG. 5 is a block diagram showing an example of the server according to this embodiment. A CPU 501 is a central processing unit which systematically controls the server 120. A RAM 502 is a readable/writable non-volatile memory which serves as a work area. A ROM 503 is a non-volatile memory which stores a boot program and the like. A communication interface 504 is a communication circuit which communicates with the PC 110 via the network 115. A hard disk drive 405 is a large-capacity storage device, which stores an encryption processing program 510, server program 511, encrypted data 512, and the like. The encryption processing program 510 is software that encrypts original data such as firmware and the like, and executes an authentication process. The server program 511 is control software that receives a sending request of encrypted data sent from the printer 101 via the PC 110, and sends the encrypted data 512. The encrypted data 512 is encrypted data which has undergone the authentication and encryption processes.

(Encryption Process)

Figure 6:
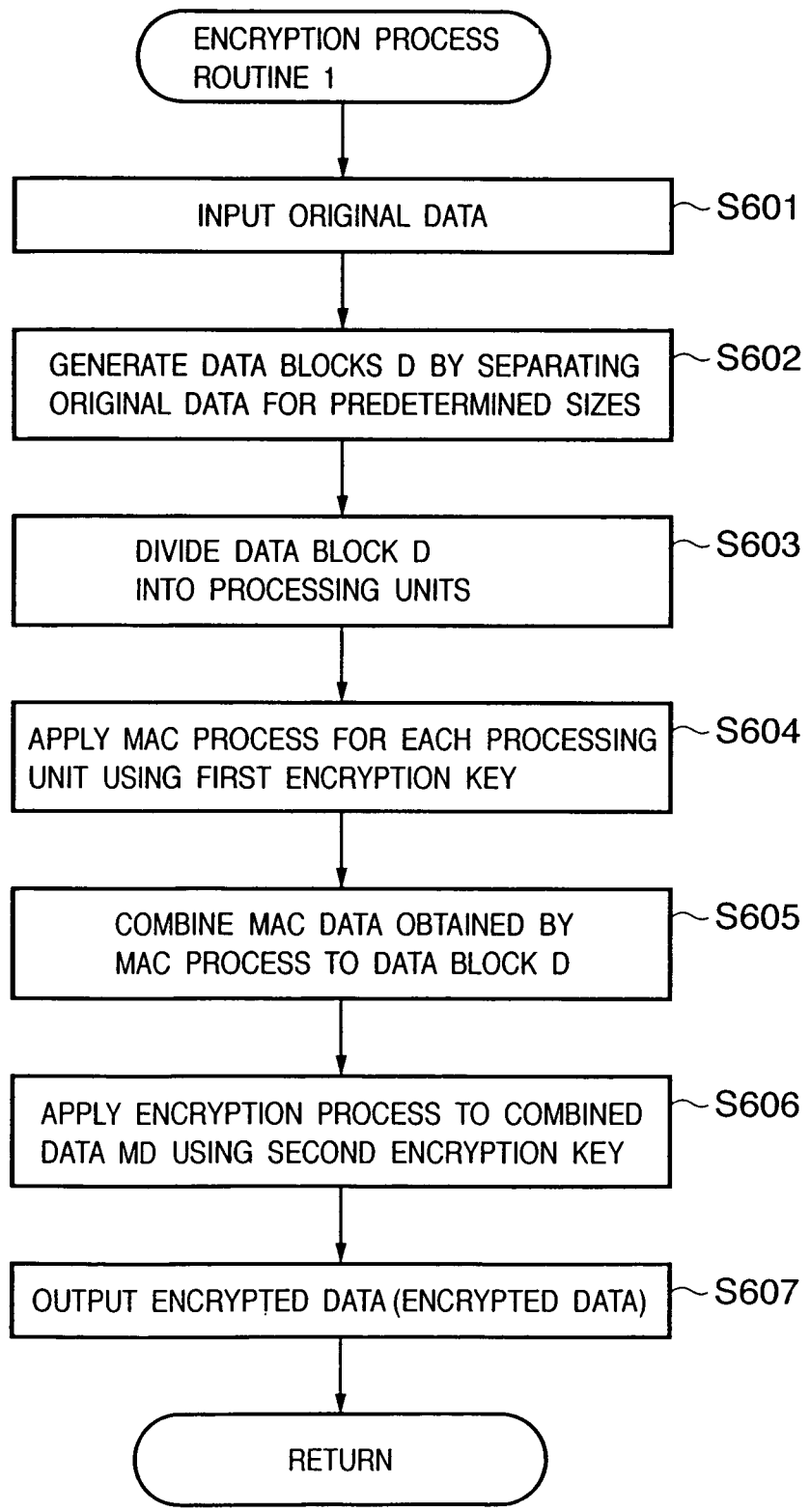
FIG. 6 is a flowchart showing an example of an encryption process according to the embodiment of the present invention.

FIG. 6 is a flowchart showing an example of the encryption process according to this embodiment. This flowchart corresponds to the encryption processing program 510 of the server 120.

Figure 7:
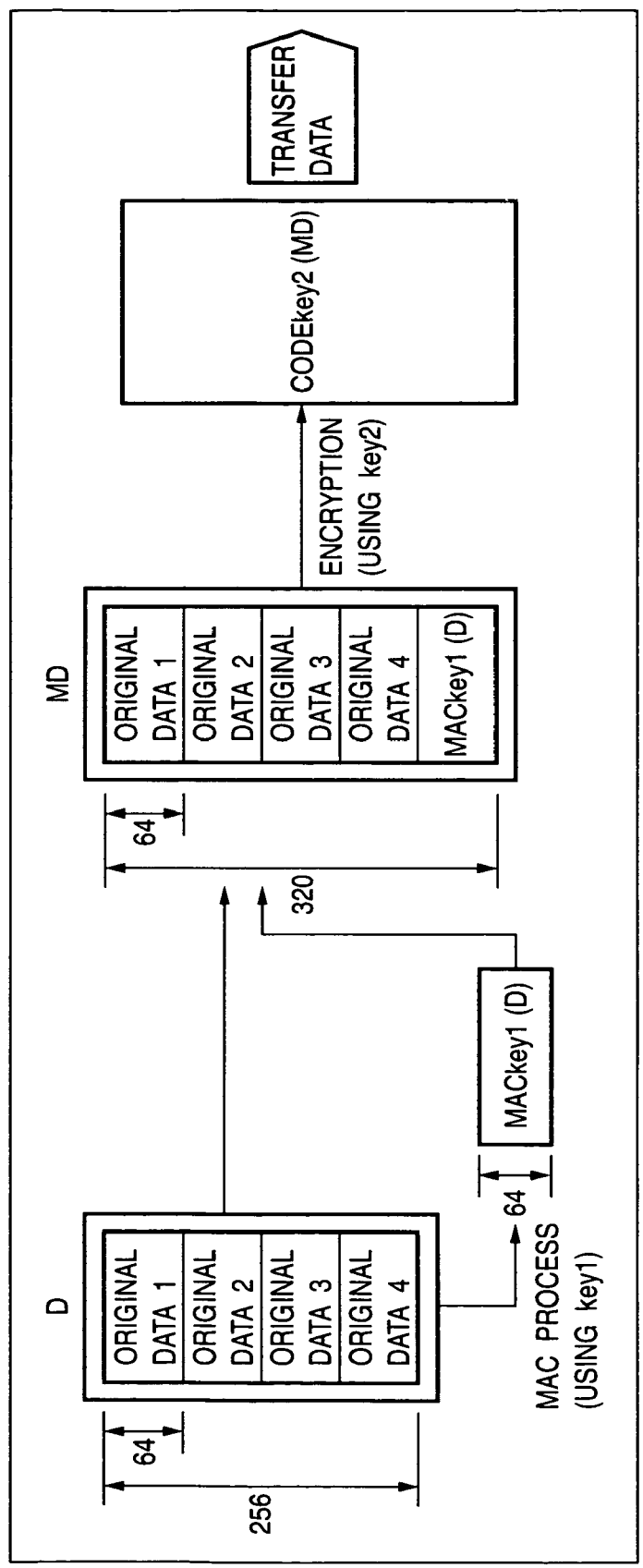
FIG. 7 is a view for explaining an overview of the encryption process according to the embodiment of the present invention.

FIG. 7 is a view for explaining an overview of the encryption process according to this embodiment. In this example, the bank size of the flash ROM 202 is 128 bits, and the transfer data block has a 256-bit length. That is, when firmware of the printer 101 is used as original data, and the original data is divided into a plurality of data blocks, each data block size is set to be an integer multiple of the bank size of the ROM 202. In FIG. 7, D indicates an original data block of 256 bits, which are twice the bank size.

In this example, an input bit length of data to be input per MAC process is 64 bits. Key data key1 (corresponding to the aforementioned key b 308) is used in the MAC process, and key data key2 (corresponding to the aforementioned key a 307) is used in the encryption process. MACkey1(D) is MAC data obtained by applying key1 to original data block D. MD is data obtained by appending MACkey1(D) to original data block D. CODEkey2(MD) is the encrypted data 512 obtained using MD and key2.

In step S601, the CPU 501 inputs original data such as firmware or the like from the hard disk drive 505 or the like.

In step S602, the CPU 501 generates data blocks D by separating the input original data into predetermined sizes. The predetermined size is an integer multiple of the bank size of the flash ROM 202. In the example of FIG. 7, the predetermined size is 256 bits.

In step S603, the CPU 501 divides data block D into predetermined sizes that can be processed by the MAC process. In this example, the predetermined size is 64 bits.

In step S604, the CPU 501 executes the MAC process using the first encryption key (key1) for each data serving as a processing unit.

Figure 8:
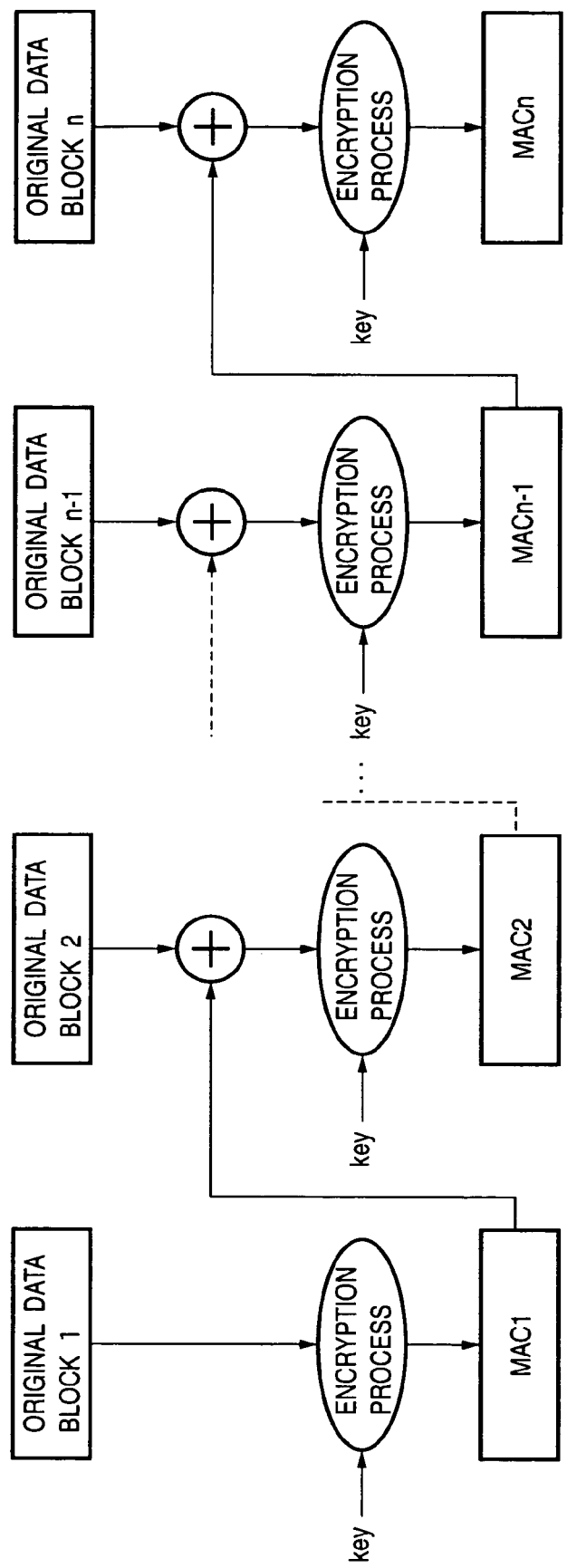
FIG. 8 is a view showing an example of a MAC process according to the embodiment of the present invention.

FIG. 8 shows an example of the MAC process according to this embodiment. In this example, since data block D having a 256-bit length is divided into original data blocks each having a 64-bit length, the MAC process is applied to original data 1 to n (n=4).

MAC1 is MAC data obtained when the MAC process is executed by applying the first encryption key (key1) to original data block 1. Other MAC2 to MACn are MAC data obtained when immediately preceding MAC data n-1 and each of original data blocks 2 to n are EXORed, and the MAC process is executed for the EXOR result using the first encryption key. In this example, MACn is MACkey1(D).

In step S605, the CPU 501 generates combined data MD by combining MAC data MACkey1(D) obtained by the MAC process to transfer data D.

In step S606, the CPU 501 executes an encryption process by applying key key2 as the second encryption key to combined data MD, and outputs encrypted data CODEkey2(MD) to the hard disk drive 505 or communication interface 504.

(Decryption Process)

Figure 9:
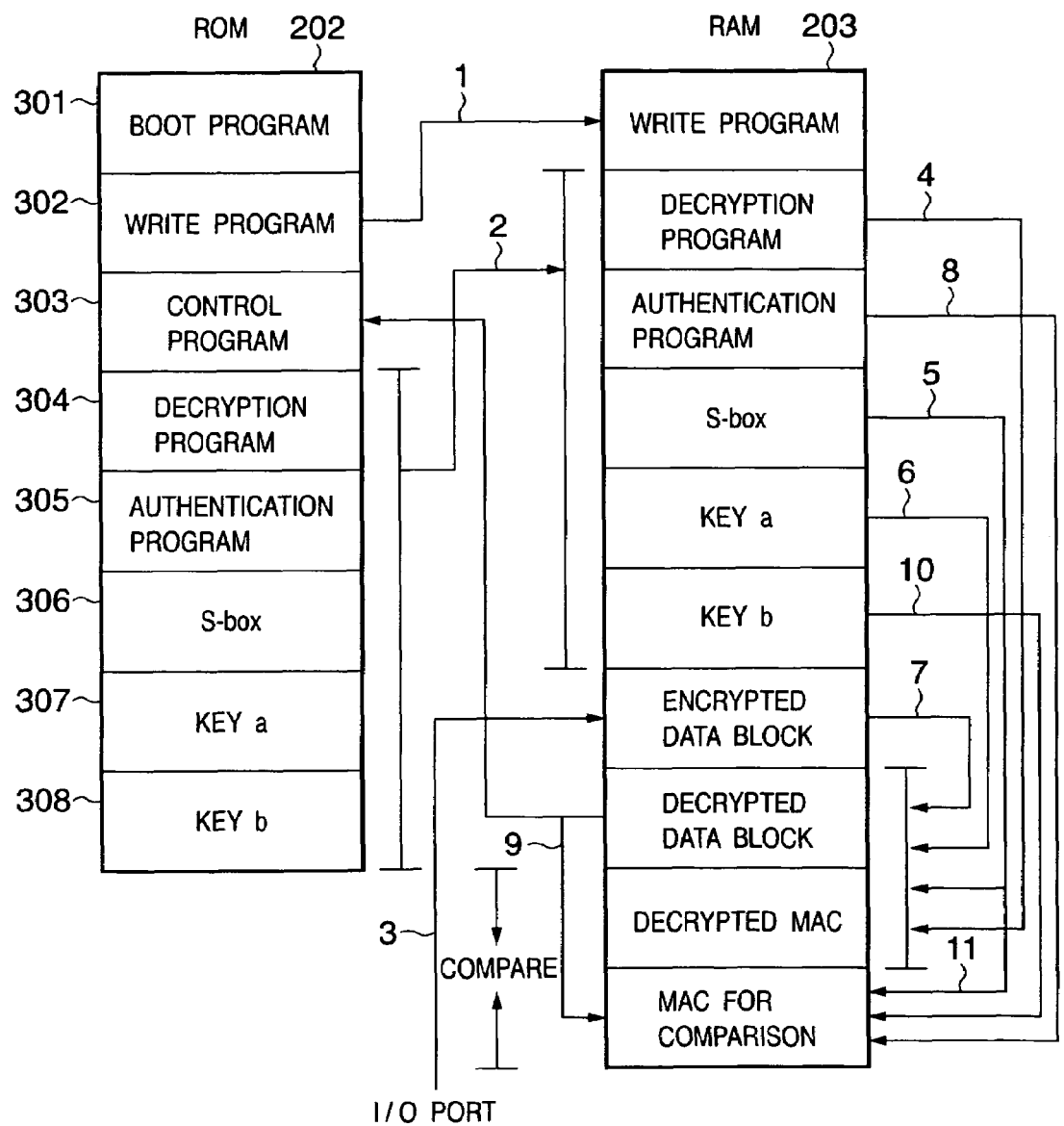
FIG. 9 shows an example of programs and data which are exchanged between the ROM and a RAM of the printer according to the embodiment of the present invention.

FIG. 9 shows an example of programs and data to be exchanged between the ROM and RAM of the printer according to this embodiment. When the power switch of the printer 101 is turned on and the boot program 301 is launched, the CPU 201 confirms whether a normal mode or program rewrite mode is set. If the normal mode is set, the CPU 201 executes the control program 303. On the other hand, when the power switch is pressed while a specific switch is held down, the CPU 201 determines that the program rewrite mode is set. If the rewrite mode is set, the CPU 201 transfers the write program 302 to the RAM 203, and also transfers the decryption program 304, authentication program 305, S-box 306, key a 307, and key b 308 to the RAM 203. These transfer processes correspond to (1) and (2) in FIG. 9.

Figure 10:
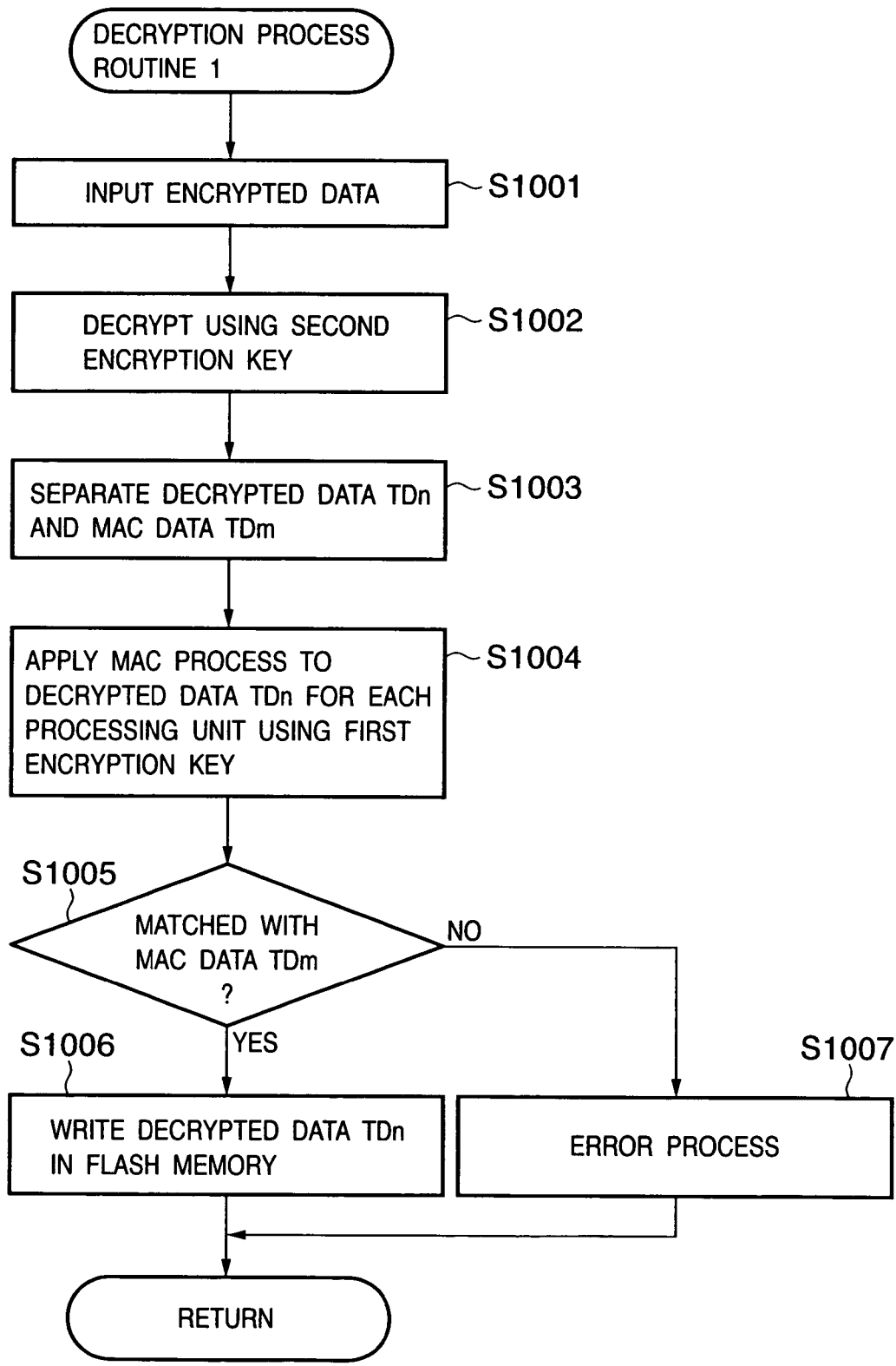
FIG. 10 is a flowchart showing an example associated with a decryption program, authentication program, and write program according to the embodiment of the present invention.
Figure 11:
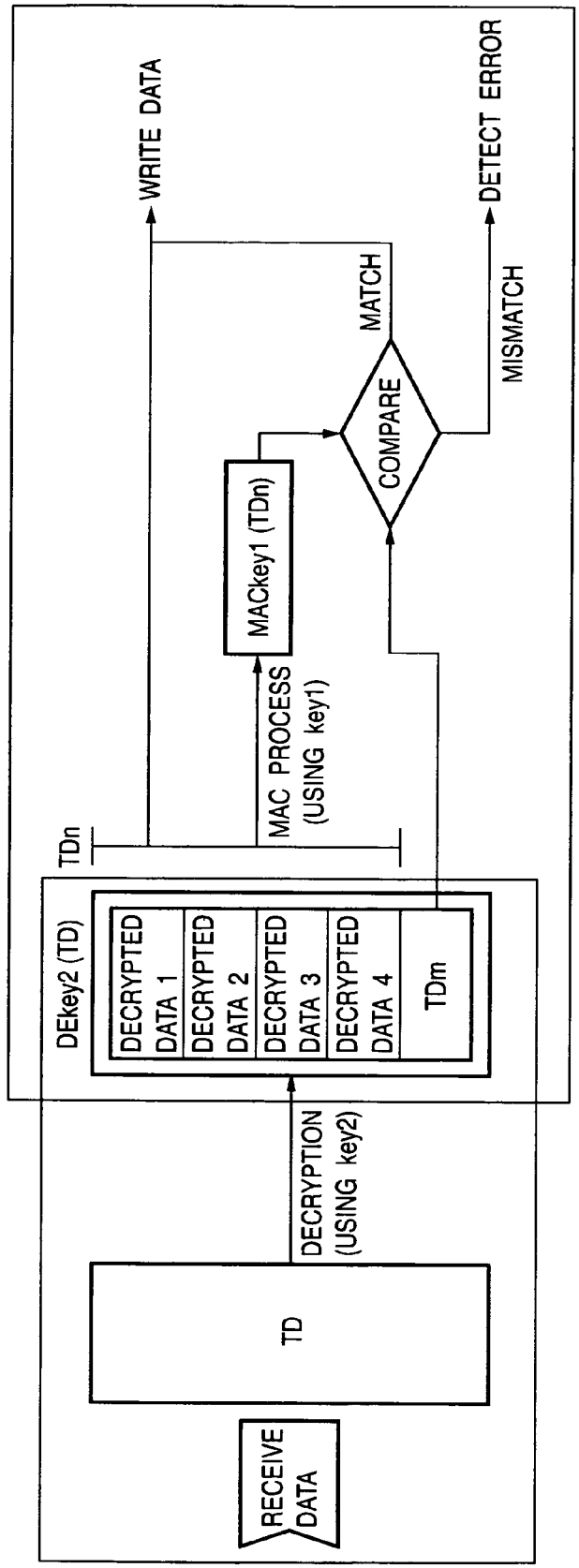
FIG. 11 is a view showing an overview of a decryption process and authentication process according to the embodiment of the present invention.

FIG. 10 is a flowchart showing an example associated with the decryption program, authentication program, and write program according to this embodiment. FIG. 11 is a view showing an overview of the decryption and authentication processes according to this embodiment. The CPU 201 sends a sending request of encrypted data from the I/O port in advance. Upon reception of the sending request of encrypted data from the printer 101 via the I/O port 406, the CPU 401 of the PC 110 transfers the request to the server 120 via the communication interface 404. Upon reception of the request, the server 120 executes the aforementioned encryption process, and sends the encrypted data 512. When the CPU 401 of the PC 110 receives the encrypted data 512 via the communication interface 404, it outputs the encrypted data 512 to the I/O port 406.

In step S1001, the CPU 201 receives encrypted data block TD from the I/O port 204, and writes it in the RAM 203. This write process corresponds to (3) in FIG. 9.

In step S1002, the CPU 201 generates data DEkey2 including decrypted data block TDn and decrypted MAC data TDm by applying the S-box and second encryption key a to the encrypted data block according to the decryption program 304. This process corresponds to (4) to (7) in FIG. 9.

In step S1003, the CPU 201 separates decrypted data block TDn and decrypted MAC data TDm from data DEkey2.

In step S1004, the CPU 201 generates MAC data for comparison by applying the first encryption key b and S-box to each decrypted data block included in decrypted data TDn in accordance with the authentication program. This process corresponds to (8) to (11) in FIG. 9. The practical MAC process is as shown in FIG. 8. That is, the MAC process is the same as that executed by the server 120.

In step S1005, the CPU 201 compares decrypted MAC data TDm and MAC data MACkey1(TDn) for comparison in accordance with the control program. If these two data match, the flow advances to step S1006. On the other hand, if the two data do not match, this means that received encrypted data block TD does not match sent encrypted data block CODEkey2(MD). In other words, since a damage such as tampering or the like has occurred on the transmission path, an error process is executed in step S1007. The error process includes, e.g., a process for sending a re-sending request to the server 120. Note that this comparison process corresponds to (12) in FIG. 9. In this manner, since only damaged encrypted data block TD is requested to be re-sent, the processing efficiency is high compared to the conventional method which requests to re-send the whole encrypted firmware or the like.

In step S1006, the CPU 201 writes decrypted data block TDn in the flash ROM 202 using the write program 302. The CPU 201 deletes the encrypted data block, decrypted data block, and two MAC data to assure a free area of the RAM 203.

If encrypted data blocks still remain on the server 120 side, the CPU 201 sends a sending request associated with the next encrypted data block via the PC 110. If all the encrypted data blocks are finally decrypted and are written in the flash ROM 202, the CPU 201 ends the process associated with this flowchart, and resets the printer 101.

According to this embodiment, if noise is mixed during transfer of CODEkey2(MD) and data is partially or fully changed or data is intentionally rewritten, an authentication error can be detected for each encrypted data block. More specifically, an authentication error can be detected within a shorter period of time than the prior art that cannot make authentication unless the full encrypted data is obtained.

Since the MAC process is executed using an integer multiple of the bank size of the flash ROM 202 as a unit, the decrypted data can be instantly written in the flash ROM 202. That is, when the size of the decrypted data is not an integer multiple of the bank size as in the prior art, the decrypted data cannot be written at the same time, and new data must be processed while leaving the remaining data in the RAM 203.

By contrast, in this embodiment, since the decrypted data can be written in the ROM at the same time, and the RAM area can be released, newly received encrypted data can be processed in the RAM area. In this manner, since the size of the decrypted data block is an integer multiple of the bank size of the non-volatile memory, the decrypted data block can be written in the non-volatile memory by a single write process, thus simplifying the write program compared to the conventional method.

Furthermore, since each encrypted data block with the predetermined size is transferred, authenticated, and decrypted, encrypted data can be efficiently transferred to an electronic device having a small RAM size. In the above example, since the size of a data unit to which one MAC data is appended is 256 bits, the decryption and authentication processes can be executed by only storing 256-bit data in the RAM. More specifically, when firmware has a huge size, authentication can be made by receiving only the 256-bit encrypted data block, the decryption and authentication processes can be executed without waiting for reception of the whole encrypted firmware.

Therefore, errors of the received encrypted data can be detected earlier than the conventional method. Note that the RAM need only have an area that stores decrypted data having the same size as the encrypted data block, and an area that stores data and programs for decryption and authentication, in addition to an area that stores the encrypted data block.

An example that explains the excellent effects of the invention according to this embodiment will be introduced. Original data such as firmware or the like to be sent has a size of 5,120 bits as a whole. The number of bits of decryption that can be executed in one process is 64 bits, the input bits of MAC are 64 bits, and the ROM bank size is 128 bits. Under such conditions, the numbers of times of the decryption, authentication, and MAC processes will be examined. Since two processes, i.e., the decryption and authentication processes are to be executed in the printer 101, the number of times of the encryption process in the server 120 will not be counted.

In a series of decryption and authentication processes shown in FIG. 11, the decryption process is executed five times (since decrypted data 1 to 4 and MAC data are to be decrypted), and the MAC process is executed four times (since the MAC process is executed for decrypted data 1 to 4). Since the number of bits of original data that can be processed in the series of decryption and authentication processes is 256 bits, the series of decryption and authentication processes are executed 20 times for all 5,120 bits (5,120/256=20). Therefore, the number of times of execution of the decryption process is 100, and that of the MAC process is 80. Note that the authentication process can be executed for every 256 bits.

Next, the number of times of processing will be examined under the assumption that each unit to which MAC data is appended is 64 bits. In the series of decryption and authentication processes, the decryption process is executed twice, and the authentication process is executed once. Since the number of bits of original data that can be processed in the series of decryption and authentication processes is 64 bits, this process is executed 80 times for all 5,120 bits. Hence, the times of execution of the decryption process is 160, and that of the MAC process is 80. Note that authentication can be executed for every 64 bits in this case.

As can be seen from the above examination results, a change in unit size of a data block to which MAC data is appended can be a trade-off for the execution speed of the decryption and authentication processes.

Second Embodiment

The second embodiment is a partial modification to the first embodiment. In the first embodiment, the MAC process is applied to original data blocks 1 to n, and the encryption process is then executed. In the second embodiment, original data blocks 1 to n are encrypted, and the MAC process is then executed. For this reason, since the authentication process can be executed before decryption in the decryption process, an error of the received encrypted data can be detected earlier than the first embodiment.

(Encryption Process)

Figure 12:
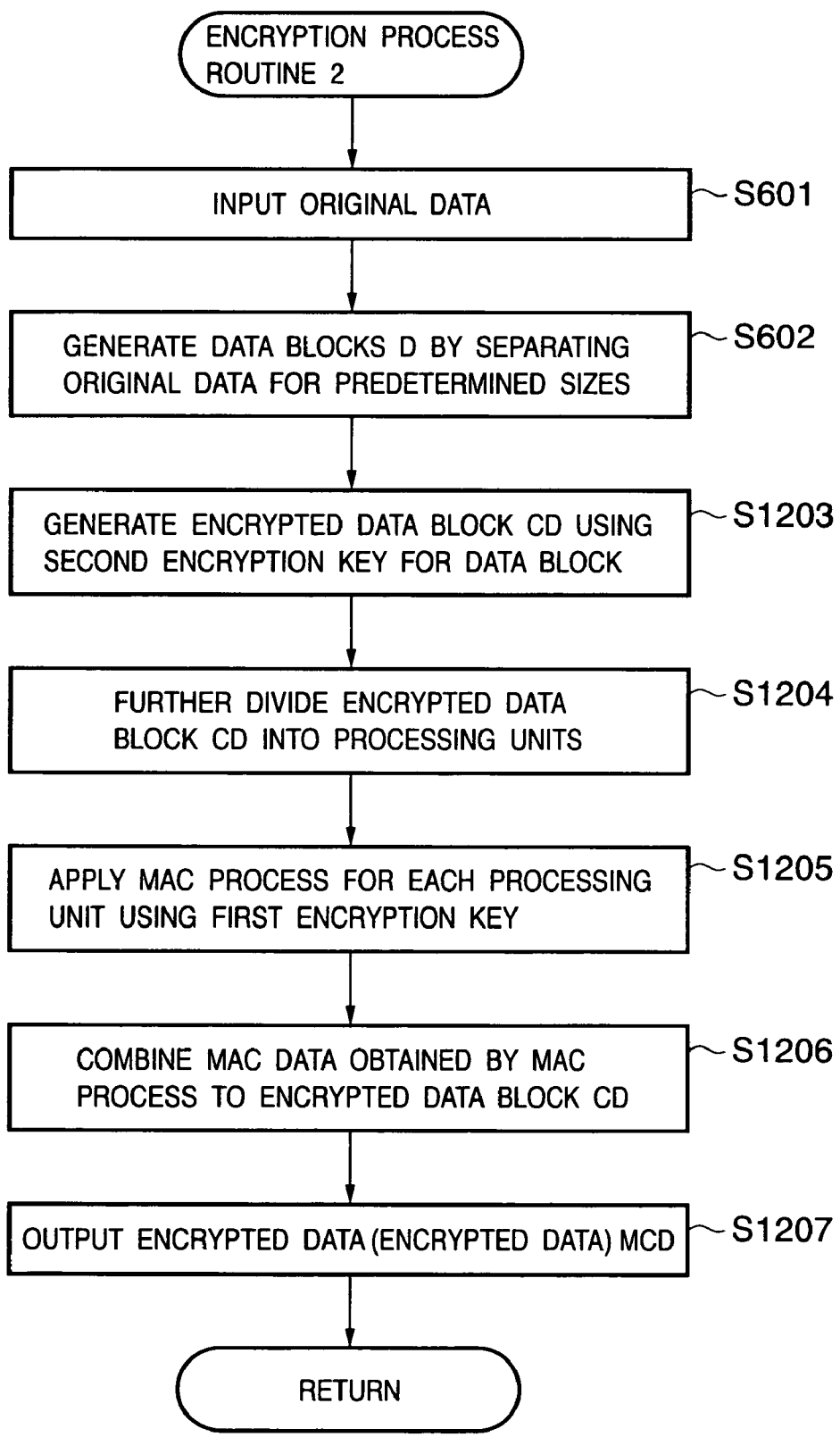
FIG. 12 is a flowchart showing an example of an encryption process according to the second embodiment of the present invention.
Figure 13:
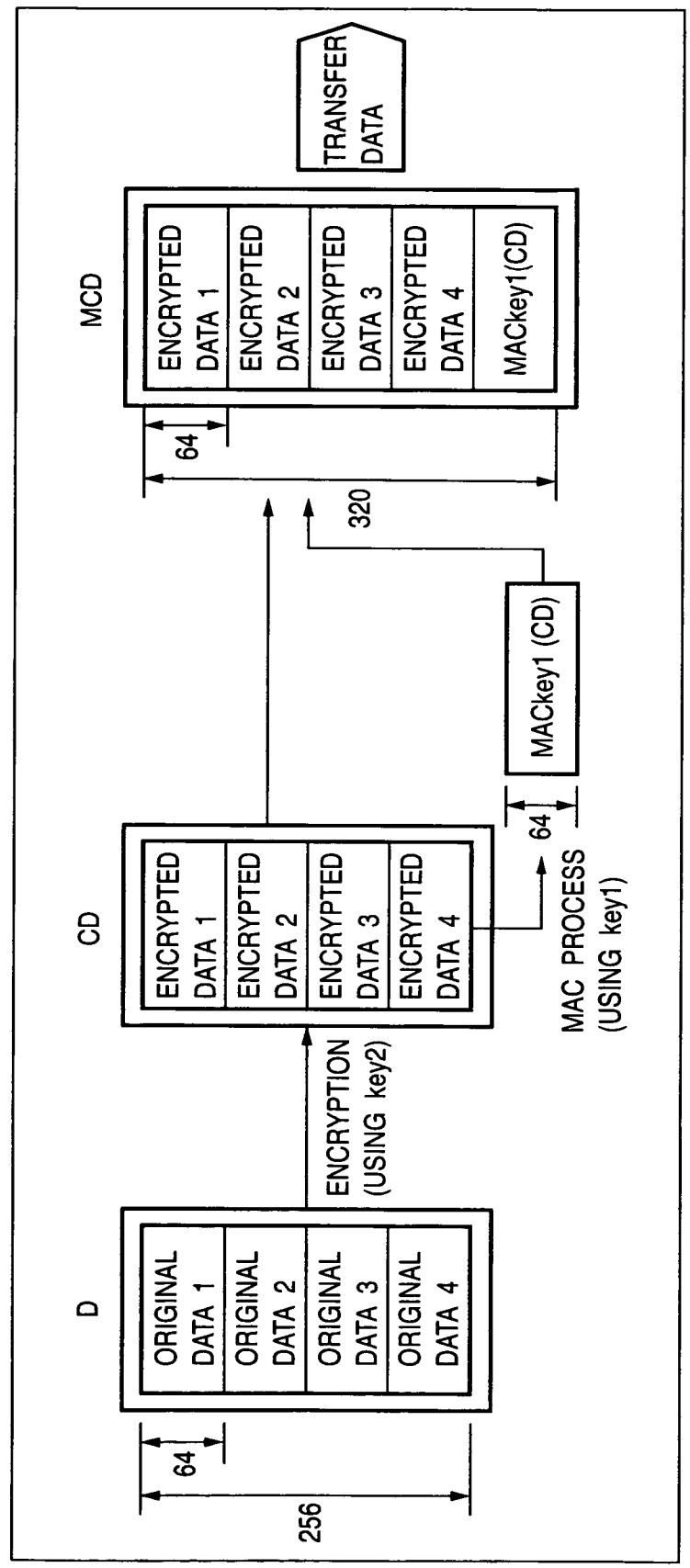
FIG. 13 is a view for explaining an overview of the encryption process.

FIG. 12 is a flowchart showing an example of the encryption process according to the second embodiment. FIG. 13 is a view for explaining an overview of the encryption process. Note that the same reference numerals denote the already explained processes so as to simplify a description. After steps S601 and S602 described above are executed, the flow advances to step S1203.

In step S1203, the CPU 501 of the server 120 generates encrypted data block CD by applying second encryption key key2 to data block D.

In step S1204, the CPU 501 divides encrypted data block CD into processing units that can be processed by the MAC process. In this example, as described above, the 256-bit encrypted data block is divided every 64 bits to generate encrypted data blocks 1 to 4.

In step S1205, the CPU 501 generates MAC data MACkey1(CD) by applying first encryption key key1 to the encrypted data block for each processing unit. An example of the practical MAC process is as has been explained using FIG. 8.

In step S1206, the CPU 501 generates combined data MCD by combining MAC data MACkey1(CD) to encrypted data block CD.

In step S1207, the CPU 501 outputs (writes) combined data MCD to the hard disk drive 50 as the encrypted data 512, or outputs (sends) it from the communication interface 504 to the PC 110 or printer 101.

(Decryption Process)

Figure 14:
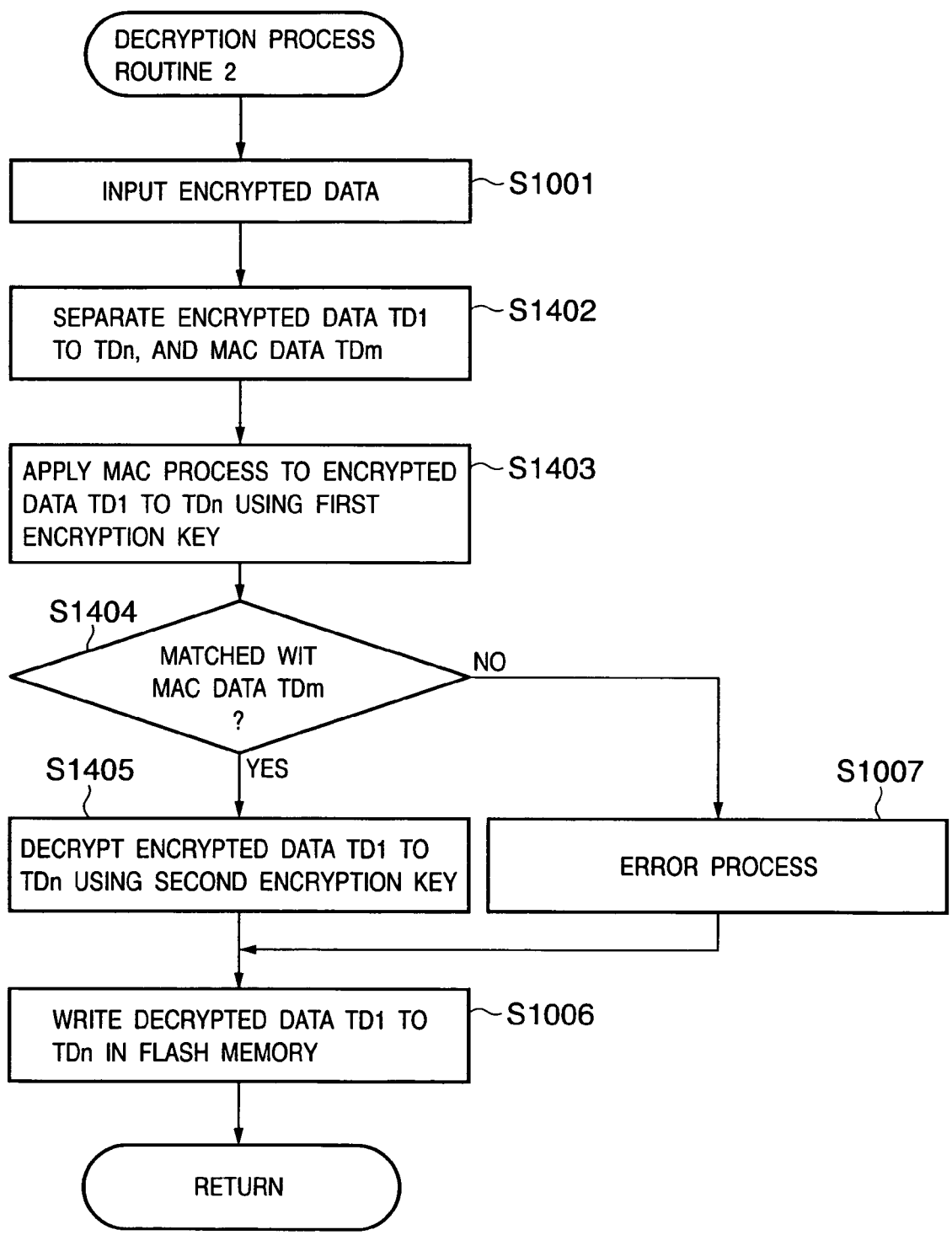
FIG. 14 is a flowchart showing an example of a decryption process according to the second embodiment of the present invention.
Figure 15:
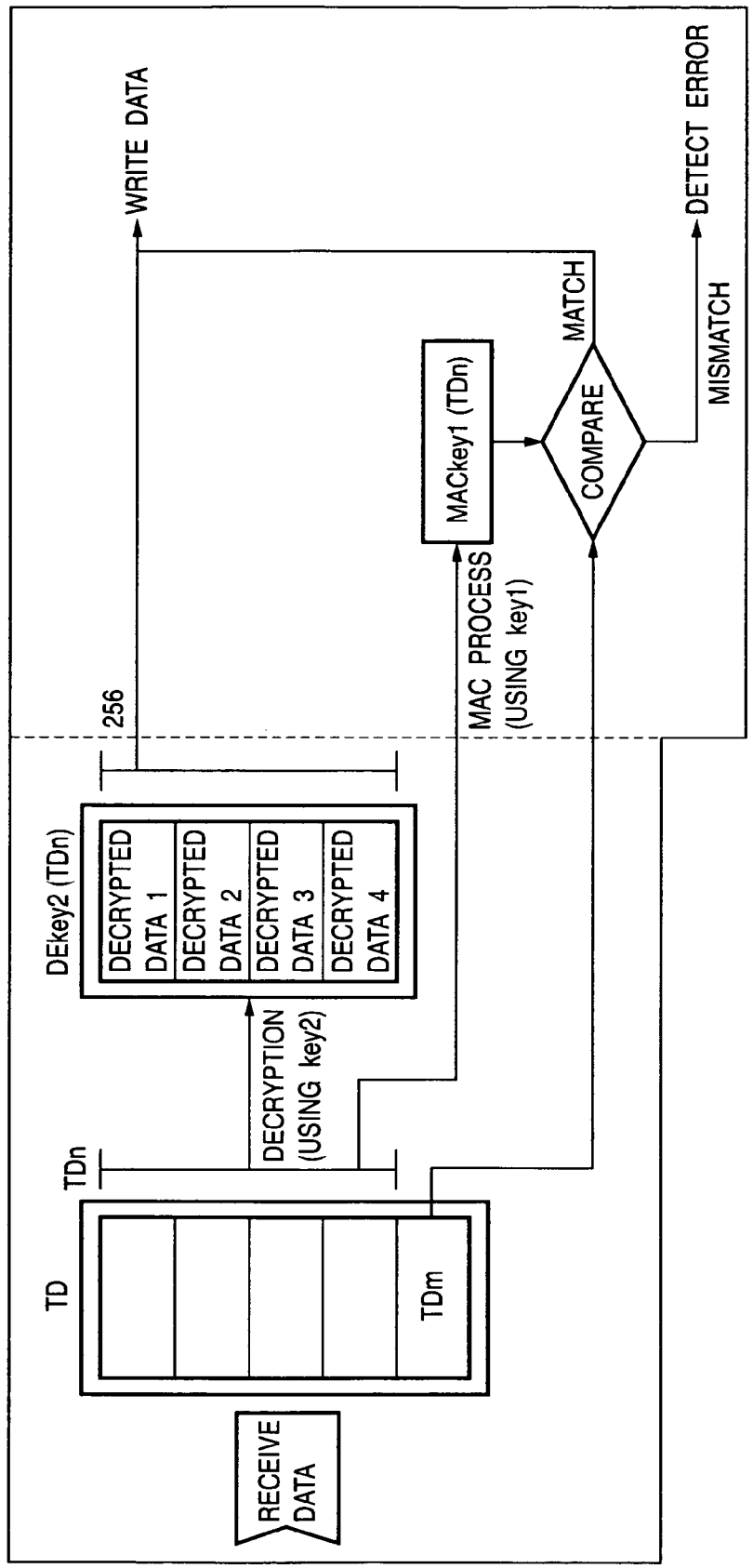
FIG. 15 is a view for explaining an overview of the decryption process according to the second embodiment of the present invention.

FIG. 14 is a flowchart showing an example of the decryption process according to the second embodiment. FIG. 15 is a view for explaining an overview of the decryption process according to the second embodiment. Note that the same reference numerals denote the already explained processes so as to simplify a description. Assume that encrypted data has already been received from the server 120 via the PC 110 in step S1001.

In step S1402, the CPU 201 separates encrypted data TD, which is input from the I/O port 204 and is stored in the RAM 203, into encrypted data block TDn and MAC data TDm. That is, MAC data TDm is extracted from encrypted data TD.

In step S1403, the CPU 201 generates MAC data MACkey1(TDn) by executing the MAC process (FIG. 8) for respective encrypted blocks included in encrypted data block TDn using first encryption key key1.

In step S1404, the CPU 201 compares decrypted MAC data TDm and MAC data MACkey1(TDn) for comparison. If these two data match, the flow advances to step S1405. On the other hand, if the two data do not match, this means that received encrypted data TD does not match sent encrypted data MCD, i.e., a damage such as tampering or the like has occurred on the transmission path. Hence, in step S1007 an error process is executed. The error process includes, e.g., a process for sending a re-sending request to the server 120.

In step S1405, the CPU 201 decrypts encrypted data block TDn by applying second encryption key key2, and generates decrypted data DEkey2(TDn) including decrypted data 1 to 4.

In step S1006, the CPU 201 writes decrypted data block DEkey2(TDn) in the flash ROM 202 using the write program 302. If encrypted data still remain on the server 120 side, the CPU 201 sends its sending request. If all the encrypted data are finally decrypted and are written in the flash ROM 202, the CPU 201 ends the process associated with this flowchart, and resets the printer 101.

According to this embodiment, in addition to the effects of the first embodiment, since the authentication process can be executed before decrypting encrypted data, tampering or the like of encrypted data can be detected earlier than the first embodiment. If authentication has failed, control is made to skip the decryption process. Hence, wasteful processes can be omitted.

Other Embodiment

In the description of the above embodiments, the one-chip CPU 103 that integrates controllers into one chip is used. However, the present invention is not limited to such specific arrangement. For example, all or some of the CPU, ROM, RAM, and I/O port may be formed as independent components.

In the above embodiments, the printer 101 has been exemplified. However, the present invention can be suitably applied to any other electronic devices as long as they receive encrypted firmware, data, and the like via the network.

According to the above embodiments, the printer 101 is connected to the server 120 via the PC 110. If the printer 101 comprises a communication interface and client program, it may be directly connected to the network 115.

In the above embodiments, terms "division" and "separation" of data are used, and these terms include not only a case wherein data is physically divided or separated but also a case wherein data is locally divided or separated. That is, to specify and extract a part of data for the sake of processing although it is one data as an entity is explained as division or separation.

Note that the present invention can also be achieved by directly or remotely supplying a software program that implements the functions of the aforementioned embodiments (programs corresponding to the flowchart shown in FIG. 6, 10, 12, or 14 in the above embodiments) to a system or apparatus, and reading out and executing the supplied program code by a computer of that system or apparatus.

Therefore, the program code itself installed in a computer to implement the functional process of the present invention using the computer implements the present invention. That is, the present invention includes the computer program itself for implementing the functional process of the present invention.

In this case, the form of program is not particularly limited, and an object code, a program to be executed by an interpreter, script data to be supplied to an OS, and the like may be used as along as they have the program function.

As a recording medium for supplying the program, for example, a flexible disk, hard disk, optical disk, magnetooptical disk, MO, CD-ROM, CD-R, CD-RW, magnetic tape, non-volatile memory card, ROM, DVD (DVD-ROM, DVD-R), and the like may be used.

As another program supply method, the program may be supplied by establishing connection to a home page on the Internet using a browser on a client computer, and downloading the computer program itself of the present invention or a compressed file containing an automatic installation function from the home page onto a recording medium such as a hard disk or the like. Also, the program code that forms the program of the present invention may be segmented into a plurality of files, which may be downloaded from different home pages. That is, the present invention includes a WWW server which makes a plurality of users download a program file required to implement the functional process of the present invention by the computer.

Also, a storage medium such as a CD-ROM or the like, which stores the encrypted program of the present invention, may be delivered to the user, the user who has cleared a predetermined condition may be allowed to download key information that decrypts the program from a home page via the Internet, and the encrypted program may be executed using that key information to be installed on a computer, thus implementing the present invention.

The functions of the aforementioned embodiments may be implemented not only by executing the readout program code by the computer but also by some or all of actual processing operations executed by an OS or the like running on the computer on the basis of an instruction of that program.

Furthermore, the functions of the aforementioned embodiments may be implemented by some or all of actual processes executed by a CPU or the like arranged in a function expansion board or a function expansion unit, which is inserted in or connected to the computer, after the program read out from the recording medium is written in a memory of the expansion board or unit.

The present invention can be applied to a system constituted by a plurality of devices, or to an apparatus comprising a single device. Furthermore, it goes without saying that the invention is applicable also to a case where the object of the invention is attained by supplying a program to a system or apparatus.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2004-218842 filed on Jul. 27, 2004, which is hereby incorporated by reference herein.

What is claimed is:

1. A decryption apparatus comprising:
a rewritable non-volatile memory;
an input unit which inputs encrypted data;
a decryption unit which decrypts the input encrypted data to decrypted data using a first encryption key;
a division unit which divides the decrypted data into a decrypted data block which has a size as an integer multiple of a bank size of said rewritable non-volatile memory, and authentication data;
a comparison data generation unit which generates comparison data using a second encryption key for the decrypted data block;
a determination unit which determines authenticity of the decrypted data block by comparing the comparison data with the authentication data; and
a write unit which writes the decrypted data block, which is determined to be authentic, in said rewritable non-volatile memory; and
a re-sending request unit which sends, when it is determined that the decrypted data block is unauthentic, a re-sending request of the encrypted data corresponding to only the unauthentic decrypted data block.

2. The apparatus according to claim 1, further comprising a control unit which controls to continue a decryption process by deleting the decrypted data block from a work volatile memory upon completion of write of the decrypted data block into said non-volatile memory, receiving next encrypted data from said input unit, and storing the next encrypted data in the volatile memory.

3. A decryption apparatus comprising:
a rewritable non-volatile memory;
an input unit which inputs encrypted data;
a division unit which divides the input encrypted data into at least one encrypted data block which has a size as an integer multiple of a bank size of said rewritable non-volatile memory, and authentication data;
a comparison data generation unit which generates comparison data using a first encryption key for the encrypted data block;
a determination unit which determines authenticity of the encrypted data block by comparing the comparison data with the authentication data;
a decryption unit which generates a decrypted data block using a second encryption key for the encrypted data block which is determined to be authentic; and
a write unit which writes the decrypted data block in said rewritable non-volatile memory; and
a re-sending request unit which sends, when it is determined that the decrypted data block is unauthentic, a re-sending request of the encrypted data corresponding to only the unauthentic decrypted data block.

4. The apparatus according to claim 3, further comprising a control unit which controls to continue a decryption process by deleting the decrypted data block from a work volatile memory upon completion of write of the decrypted data block into said non-volatile memory, receiving next encrypted data from said input unit, and storing the next encrypted data in the volatile memory.

* * * * *